United States Patent [19]

Verig

[11] Patent Number: 5,194,312
[45] Date of Patent: Mar. 16, 1993

[54] PROFILED SEALING STRIP WITH TWO REINFORCING BANDS

[75] Inventor: Heinz Verig, Schwelm, Fed. Rep. of Germany

[73] Assignee: Gebr. Happich GmbH, Fed. Rep. of Germany

[21] Appl. No.: 575,339

[22] Filed: Aug. 30, 1990

[30] Foreign Application Priority Data

Sep. 2, 1989 [DE] Fed. Rep. of Germany ....... 3929159

[51] Int. Cl.$^5$ ............................................. E06B 7/16
[52] U.S. Cl. ...................................... 428/122; 49/490; 52/716; 428/138; 428/358
[58] Field of Search ................... 428/122, 358, 138; 49/490; 52/716

[56] References Cited

U.S. PATENT DOCUMENTS

| | | | |
|---|---|---|---|
| 4,472,469 | 9/1984 | Thies | 428/122 |
| 4,835,031 | 5/1989 | Schroder et al. | 428/122 |
| 4,843,763 | 7/1989 | Mesnel | 428/122 X |
| 4,937,126 | 6/1990 | Jackson | 428/122 |

FOREIGN PATENT DOCUMENTS 3205743  8/1983  Fed. Rep. of Germany.
3708889  9/1988  Fed. Rep. of Germany.

Primary Examiner—Henry F. Epstein
Attorney, Agent, or Firm—Ostrolenk, Faber, Gerb & Soffen

[57] ABSTRACT

A profiled sealing strip for use on an automotive vehicle, or the like. Inside an elastomeric material strip is defined a reinforcement insert comprising two U-shaped metal bands which are oriented such that their openings are about 90° apart. The bands are attached to each other by a bonding agent along selected attachment regions. Each of the bands has an elongate web and has sides off the web which are separated into rungs arrayed alongside each other and the rungs extend transversely to the direction of extension of the profiled sealing strip. An end region of one leg of each metal band is bent off toward the end region of the other band to define an open box region in the profiled strip for bend strength.

10 Claims, 2 Drawing Sheets

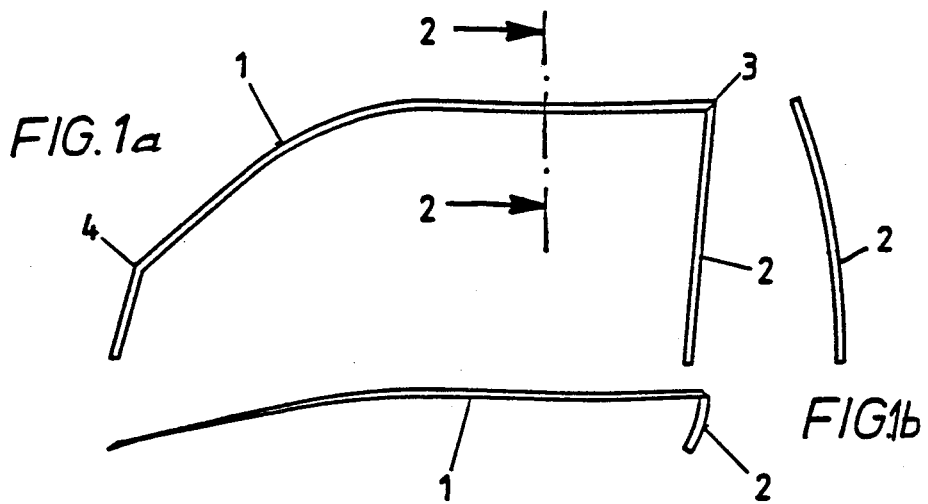
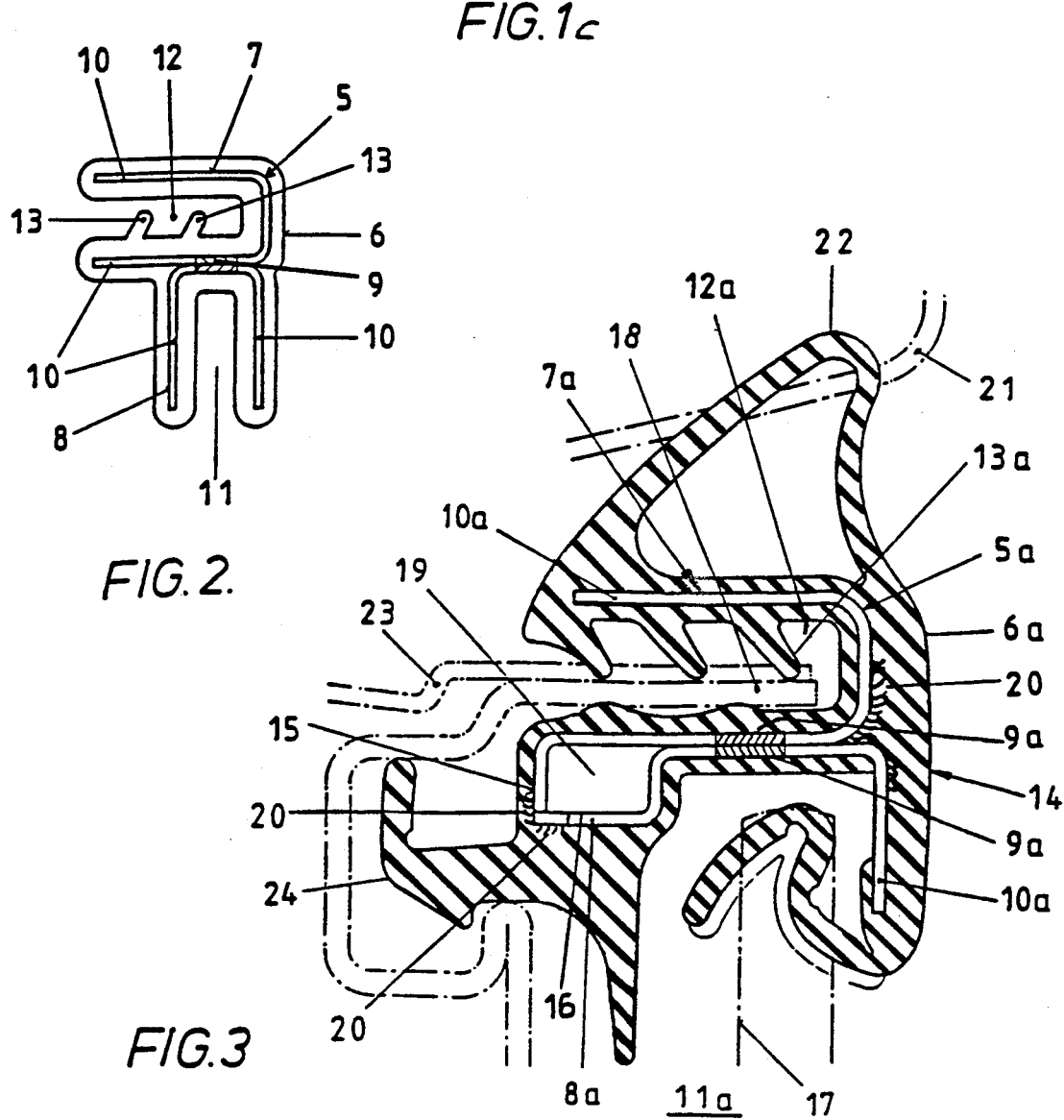

PROFILED SEALING STRIP WITH TWO REINFORCING BANDS

BACKGROUND OF THE INVENTION

The invention relates to a profiled sealing strip, particularly for use on motor vehicles, and which is formed of elastomeric and/or thermoplastic material and has an incorporated support, preferably insert of metal.

Profiled sealing strips of rubber, or the like, for use on vehicles, for example, and having an incorporated support or reinforcing insert are known and in many different embodiments. Support inserts in the form of grid bands or solid bands are known. Grid bands include at least one continuous web, which web is connected on one or both of its lateral sides with rungs which are arranged alongside each other and extend transversely of the web. The web and the rungs are formed, for example, such that window-like openings are stamped out of a strip-shaped starting material. The grid bands are then profiled, for instance, they are brought, e.g. bent, into U-shape. Then rubber, or the like, is sprayed around them in a continuous process. The main disadvantage of profiled sealing strips produced in this way resides in the unsatisfactory quality of their surface.

Profiled sealing strips having incorporated solid bands of, for instance, U-shaped profile, have the advantage of a smooth surface and have a stability which is frequently desired However, such profiled sealing strips have a disadvantage in that they must be stretch bent to adapt them to the specific contours of the vehicle. Expensive stretch-bending devices and an increased use of material is necessary. In particular, due to the rigidity of stretch bent profiled sealing strips, they are not adapted to compensate for tolerances. The use of such profiled sealing strips necessarily leads to impairments in function and to optically perceptible defects.

SUMMARY OF THE INVENTION

The object of the present invention is to provide a profiled sealing strip of the aforementioned type, which satisfies technical requirements as to stability, i.e. it is sufficiently rigid while it is still so flexibly elastic that it can be bent without expensive stretch bending operations. At the same time, it should assure unobjectionable surface quality and be adapted to compensate for tolerances with respect to length, offset and contour on the vehicle A profiled sealing strip of the invention has a support insert which comprises two elongate, profiled, preferably stiffening, metal bands which are incorporated in and are together in the profiled sealing strip. The metal bands lie against each other in at least some of their regions, and the tapes are fastened to each other, at least in those regions, via a bonding technique, e.g. with an elastomeric material. Each band has a continuous web that extends the length of the strip with a plurality of rungs which are integrally connected to and extend out from each lateral side of the respective web. The respective rungs at each lateral side of each web of the two bands are arranged alongside each other along the length of the strip, without spacing between adjacent rungs on the bands, and the rungs at each side of each web extend transverse to the longitudinal axis of the strips.

For disclosure of arranging the rungs of a metal band alongside each other, without spacing of the rungs from each other, see German Patent Application P 37 08 889.0, which corresponds to U.S. Pat. No. 4,835,031. The U.S. patent is incorporated herein by reference.

To enable bonding of the metal bands using elastomeric material, the metal bands can bear a coating of a coupling agent placed at least in regions thereof which are attached Other measures may comprise perforating or puncturing the metal bands in the region in which they lie against each other.

In a further embodiment, the metal bands each have a covering of elastomeric material and are incorporated together with that covering in the profiled sealing strip.

In a special embodiment of the invention, each metal band can be profiled into a U-shape, and the bands are so arranged with respect to each other that the openings into the two U's are shifted or offset about 90° from each other.

In accordance with a preferred further development of the invention, the metal bands are so shaped and arranged alongside of each other in the profiled sealing strip that they form an open box shape with each other in certain regions. For this purpose, each metal band is of U-shaped profile. In each case, one leg of each U-shaped metal band has an outwardly bent free end region. The free ends of these end regions are placed against each other to form the open box shape. The development of the box shape enables angle pieces to be inserted into the miter region of two lengths of profiled sealing strips to obtain increased stability.

Other objects and features of the invention are explained with reference to the accompanying drawings.

BRIEF DESCRIPTION OF THE DRAWINGS

FIGS. 1a, b and c are respectively side, end and top views of a profiled sealing strip assembly for an upper part of a door frame casing in a motor vehicle;

FIG. 2 is a cross section through a first embodiment of a profiled sealing strip approximately along the line A—A of FIG. 1;

FIG. 3 is a cross section through a second, preferred embodiment of a profiled sealing strip, also approximately along the line A—A of FIG. 1, and shown in the installed condition.

DESCRIPTION OF PREFERRED EMBODIMENTS

Figure 4:
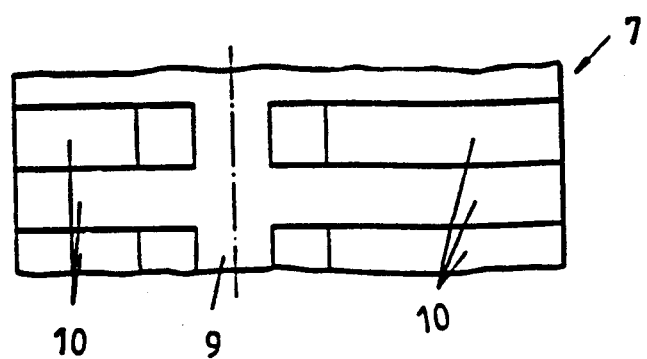
FIG. 4 shows a rung arrangement on a web of the reinforcing insert.

The profiled sealing strip assembly of FIG. 1 comprises at least two profiled sealing strip sections 1 at the top and 2 at one end, which are connected to each other at the corner region 3 of the assembly, for instance by vulcanization. If necessary, a profiled sealing strip initial separation point with later vulcanization together can also be provided in the region of the mirror triangle 4.

FIGS. 1a, b and c show the profiled sealing strip assembly as it is customarily made up and delivered, and show how the profiled sealing strip sections 1 and 2 are bent in different planes so as to correspond to the contour of the door frame of a motor vehicle.

FIG. 2 shows a cross section through a first embodiment of a profiled sealing strip in a simplified, more diagrammatic manner of presentation. The profiled sealing strip of FIG. 2 comprises an internal support insert 5 and over it there is a covering 6 of elastomeric material, preferably of rubber, embedding the insert 5 within it.

The support insert 5 is of two part development, and is formed of two U-shaped metal bands 7, 8 which are fastened together. Each metal band 7, 8 has a continuous bottom web 9. At each side of a respective web, the band includes a row of rungs 10 that extend transversely to the length of the strip and the band. The rungs are arranged, without longitudinal spacing between adjacent rungs, alongside of each other. See the rung arrangement in a developed view of one band in FIG. 4. The rungs are formed by stamping of the metal band 7, 8 followed by finish rolling. The essentially spacing free arrangement of the adjacent individual rungs 10 is important. This defines a smooth outer surface for the covering 6 without indentations.

The U-shaped metal bands 7, 8 are in contact with each other at the web 9 of one band and on a leg near the web 9 of the other band. The bands are arranged with respect to each other so that their respective U openings 11, 12 are displaced or oriented about 90° away from each other. The covering 6 over the insert 5, 7, 8 is developed, that is it is of such thickness, that the U openings 11, 12 remain open. The U opening 11 is intended, for instance, to receive an edge of a window pane (not shown) and the U opening 12 is intended, for instance, to receive an edge of a body or door frame flange (not shown). The opening 12 has, within it, clamping lips 13 on the inward facing sides or legs of the U, which lips are angled to permit installation of the strip onto the body flange while preventing the unintended pulling of the profiled sealing strip off the flange.

The metal bands 7, 8 may be fastened to each other exclusively by rubber bonding. This can be effected by coating the surfaces of the metal bands 7, 8 with a coupling agent at least in certain regions of the surfaces, for instance in their facing or abutting regions. The metal bands are pretreated with a suitable bonding substance, for instance, a lacquer. This assures the adherence of, for instance, rubber and rubber materials, without it being necessary for the metal bands 7, 8 to be perforated to effect adherence, although it is possible for the bands to be perforated in the case of the new profiled sealing strip. The rubber material bonding or similar bonding can also be accomplished with a thin film of, for instance, elastomeric material, extruded around the metal band 7, 8, to form the covering 6 (for instance phenol-formaldehyde/polypropylene/rubber etc.) which forms an intimate bond with the films being extruded thereover. The rubber material bonding between the bands 7 and 8 makes it possible for each of the metal bands 7 and 8 of the support insert 5 to be deformed within wide limits independently of the other band in several planes, i.e. around bends in the longitudinal direction of the profiled sealing strip.

FIG. 3 shows a cross section through a profiled sealing strip that is developed as a window guide profile 14. The profiled sealing strip has a first profiled metal band 7a and a second profiled metal band 8a. The metal bands 7a and 8a are in contact with each other in at least a few of their regions. The bands are embedded in a covering 6a which also assures the rubber bond between the metal bands 7a and 8a. The metal bands 7a and 8a are developed, in principle, in the same manner as in the embodiment of FIG. 2. Therefore, each of them has a continuous web 9a and on each side of the web, there are rows of rungs 10a which are arranged alongside of each other without space between adjacent rungs.

The metal band 7a is of a generally U-shaped profile. One of the legs of the U has a free, outwardly bent end region 15. The metal band 8a is also generally of U-shape. One of its legs has an outwardly bent end region 16. Similar to the embodiment of FIG. 2, the metal bands 7a, 8a are embedded in and lie against each other in the cover 6a, such that the two U openings 11a, 12a are oriented or offset about 90° from each other, and those openings are also defined in the cover 6a. The U-opening 11a receives a moveable window pane 17 and the U opening 12a holds the profiled sealing strip against a door frame flange 18 against which the clamping lips 13a of the covering 6a come to rest.

As further shown in FIG. 3, the metal bands 7a, 8a are embedded in the covering material so that the free ends of their bent-off end regions 15, 16 abut each other in order that the metal bands 7a, 8a together form a box shape opening 19. This imparts greater stiffness to the support insert 5a without its losing the ability to be bent without stretch-bending operations, since the individual metal bands 7a, 8a remain deformable independently of each other.

The metal bands 7a, 8a are fastened to each other by rubber bonding. The small curved lines 20 indicate, for instance, the regions in which the metal bands 7a, 8a can be provided with a coupling agent which effects the rubber bonding.

The profiled sealing strip of FIG. 3 has the U opening 11a which forms a window-pane guide, has a sealing part 22 which acts against the vehicle body 21 and has an anchoring part 24 which engages into the vehicle door frame 23. Reference is had to these features merely for the sake of completeness Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A profiled sealing strip, for automotive vehicles, comprising elastomeric material and a reinforcing insert within the elastomeric material; the strip having a length direction;

the insert comprising:

two profiled, stiff but bendable bands extending along the length of the strip and being disposed next to each other, each of the bands including a respective side surface which rests against the respective side surface of the other band in a region along the length of the strip, and each of the bands including respective sections which do not contact the other band and which are adapted to engage different parts of a vehicle body; means elastomerically bonding respective surfaces of the bands together at the region;

each of the bands having a respective continuous web extending along the length of the insert and each of the bands comprising a plurality of rungs arranged alongside each other without spacing between adjacent rungs and the rungs extending transverse to the length of the strip and to the web, and being integral with the web.

2. The profiled sealing strip of claim 1, wherein the bands are perforated in the regions in which they lie against each other.

3. The profiled sealing strip of claim 1, further comprising a covering of elastomeric material over each of the bands, and each of the bands covered with the elastomeric material is in turn incorporated in the elastomeric material of the profiled sealing strip.

4. The profiled sealing strip of claim 1, wherein each of the bands is of generally U-shape transverse to the length of the strip, each of the U's comprises two legs defining an opening of the U and a web joining the legs of the U, and the U-shaped bands are so oriented that the U openings are oriented at about 90° apart with respect to each other and open away from each other.

5. The profiled sealing strip of claim 4, wherein the bands have the side surface regions such that one of the regions of attachment is on one leg of one U-shaped band and the other region of attachment is on the web joining the legs of the other U.

6. The profiled sealing strip of claim 4, wherein the bands are so shaped and oriented that when they lie against each other, they form a hollow box shape extending the length of the profiled sealing strip.

7. The profiled sealing strip of claim 6, wherein a respective one of the legs of each of the U-shaped bands has an outer end portion which is bent off toward the respective leg of the other U-shaped band wherein the bent-off leg regions and the legs from which they are bent-off together define the box-shape.

8. The profiled sealing strip of claim 4, wherein the elastomeric material around the bands is of such thickness that there is a respective entrance opening of the elastomeric material into each of the U openings for receiving an inserted object into each of the U openings.

9. The profiled sealing strip of claim 1, wherein the bands are so shaped and arranged and lie against each other in the profiled sealing strip that they form a hollow box-shape extending along the length of the strip.

10. The profiled sealing strip of claim 1, wherein each of the bands is a metal band.

* * * * *